(12) United States Patent
Ford et al.

(10) Patent No.: US 6,736,880 B2
(45) Date of Patent: May 18, 2004

(54) DOWNHOLE GAS/LIQUID SEPARATOR SYSTEM AND METHOD

(75) Inventors: Kenneth L. Ford, Gillette, WY (US); Thomas S. Osborne, Gillette, WY (US)

(73) Assignee: Pure Savers, LLC, Gillette, WY (US)

( * ) Notice: Subject to any disclaimer, the term of this patent is extended or adjusted under 35 U.S.C. 154(b) by 0 days.

(21) Appl. No.: 10/274,690

(22) Filed: Oct. 21, 2002

(65) Prior Publication Data

US 2004/0074390 A1 Apr. 22, 2004

(51) Int. Cl.⁷ .............................................. B01D 19/00
(52) U.S. Cl. .............................. 95/248; 95/261; 95/266; 96/196; 96/214; 166/265; 166/105.5
(58) Field of Search ...................... 95/248, 249, 260, 95/266, 261; 96/193, 194, 196, 214; 166/265, 105.5

(56) References Cited

U.S. PATENT DOCUMENTS

| | | | | |
|---|---|---|---|---|
| 1,279,758 A | * | 9/1918 | Putnam | 166/105.1 |
| 1,628,900 A | * | 5/1927 | Neilsen | 166/105.5 |
| 1,751,017 A | * | 3/1930 | Sullivan | 166/105.5 |
| 5,411,088 A | * | 5/1995 | LeBlanc et al. | 166/265 |
| 5,673,752 A | | 10/1997 | Scudder et al. | |
| 6,036,749 A | | 3/2000 | Ribeiro et al. | |
| 6,066,193 A | | 5/2000 | Lee | |
| 6,155,345 A | | 12/2000 | Lee et al. | |
| 6,382,317 B1 | | 5/2002 | Cobb | |

* cited by examiner

Primary Examiner—Duane Smith
Assistant Examiner—Douglas Theisen
(74) Attorney, Agent, or Firm—Ancel W. Lewis, Jr.

(57) ABSTRACT

A downhole liquid and gas separator system has a pump, a separator and a motor, and a shroud around the pump, separator and motor. The shroud has a lower impermeable portion with a closed lower end and an upper porous portion. The upper end of the impermeable portion is above the inlet port for the separator so that production fluid flows upwards between the well casing and the shroud, over the upper end of the impermeable portion and downwards to the inlet port, generating a pressure drop and releasing gas before the production fluid enters the separator.

14 Claims, 2 Drawing Sheets

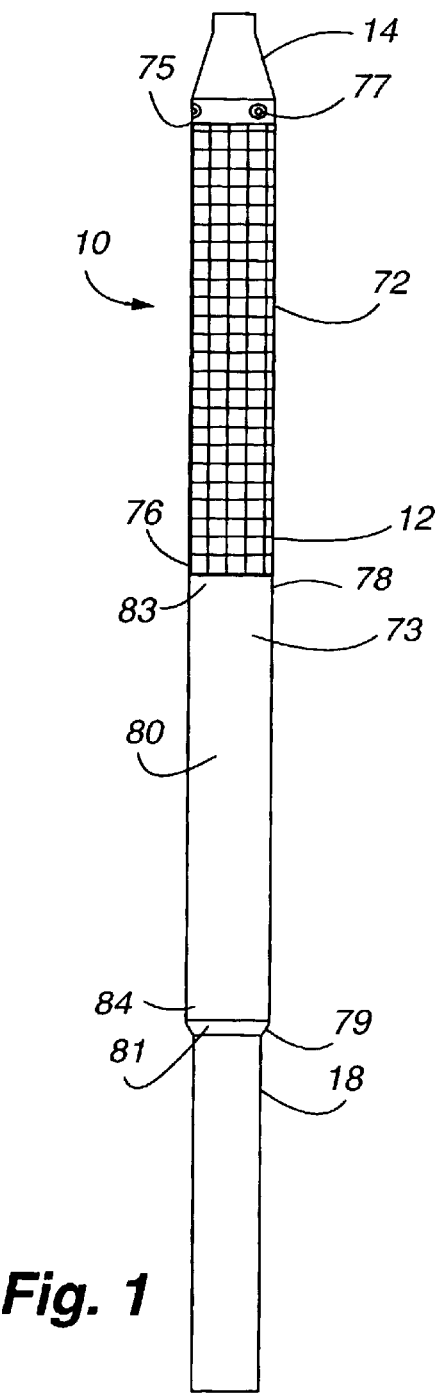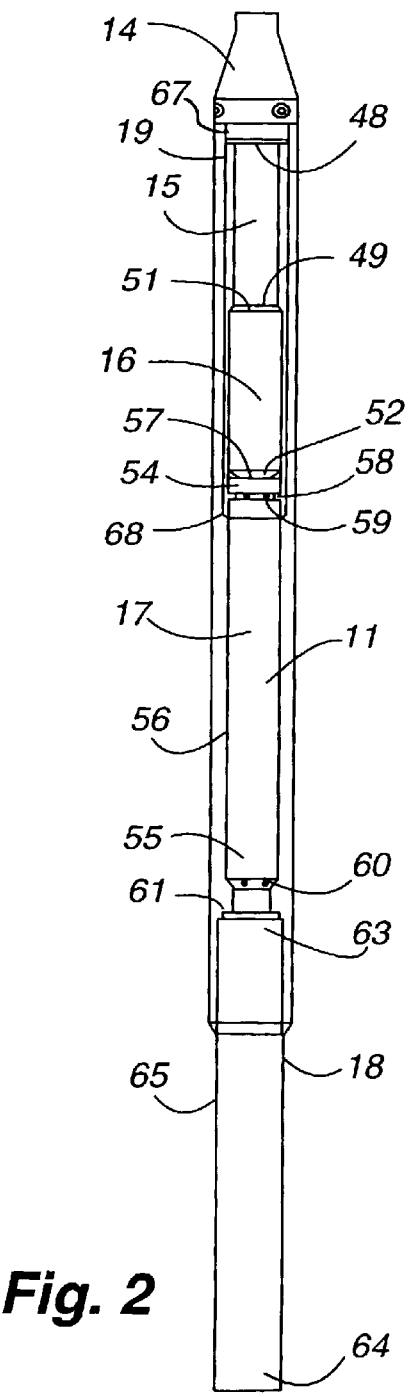
Fig. 1
Fig. 2

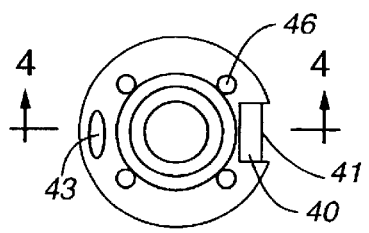
Fig. 3
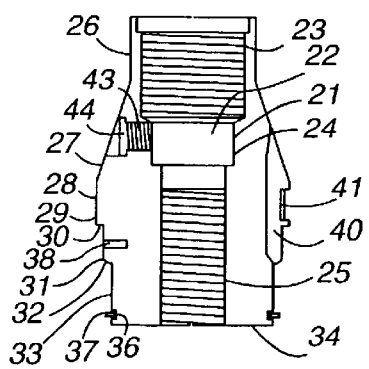
Fig. 4
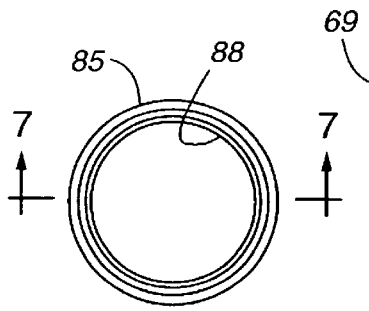
Fig. 6
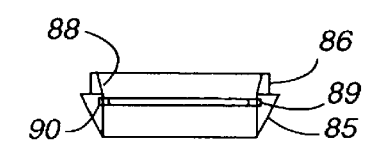
Fig. 7
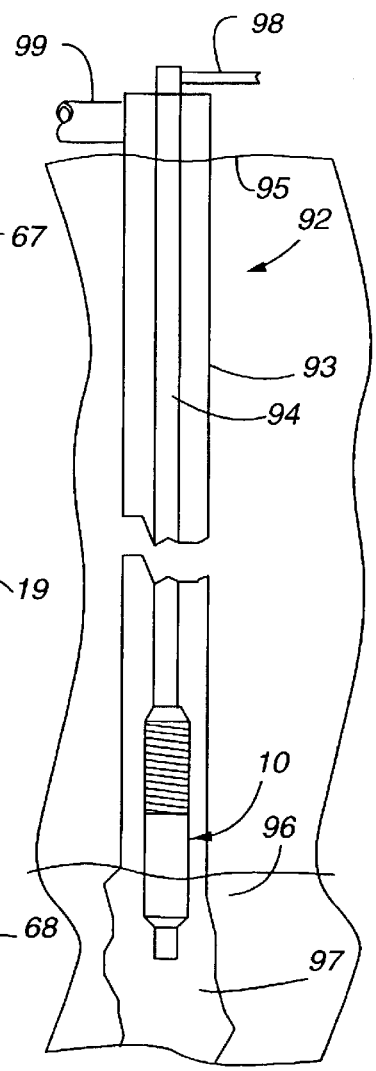
Fig. 5
Fig. 8

DOWNHOLE GAS/LIQUID SEPARATOR SYSTEM AND METHOD

TECHNICAL FIELD

The present invention relates to fluid separators for petroleum wells and more particularly to a downhole gas and liquid separator system and method.

BACKGROUND ART

Liquids are substantially incompressible fluids while gases are compressible fluids. The production fluid in an oil or gas well is generally a combination of liquids and gases. In particular, the production fluid for methane production from a coal formation includes the gas and water. Pumping such production fluid is difficult due to the compressibility of the gas. Compression of the gas reduces the efficiency of the pump and the pump can cavitate, stopping fluid flow. Downhole gas and liquid separators separate the gas and liquid in the production fluid at the bottom of the production string, before pumping the liquid up the production string, and thereby improve the efficiency and reliability of the pumping process. In some cases, the waste fluids from the production fluid may be reinjected above or below the production formation, eliminating the cost of bringing such waste fluids to the surface and the cost of disposal or recycling.

U.S. Pat. No. 5,673,752 to Scudder et al. discloses a separator that uses a hydrophobic membrane for separation. U.S. Pat. No. 6,036,749 to Ribeiro et al., U.S. Pat. No. 6,066,193 to Lee and U.S. Pat. No. 6,382,317 to Cobb disclose powered rotary separators. U.S. Pat. No. 6,155,345 to Lee et al. discloses a separator divided by flow-through bearings into multiple separation chambers.

Prior known downhole pump or separator systems have included shrouds around the pump or separator to filter production fluid before flow into the inlet port. The porous section or screen of these shrouds extends below the inlet port. Often these shrouds have an impermeable or solid section above the screen that traps gas at the top of the shroud and causes gas lock of the pump.

DISCLOSURE OF THE INVENTION

A downhole gas and liquid separator system includes means for pumping and a shroud around the means for pumping. The means for pumping has a cone, a nipple, a pump, a rotary separator and a motor respectively connected in descending order from the tubing string of a well. The shroud has a porous section extending downwardly from the cone, and an impermeable section extending downwardly from the porous section with a motor adapter at the lower end. The means for pumping includes at least one inlet port and the top of the impermeable section is located above the inlet port. The separator system is located above the bottom of the well casing so that production fluid flows up the casing to the upper end of the impermeable section, through the porous section and then flows down to the inlet port, releasing gas as the flow changes from up to down and during the downwards flow. A downhole method of separating gas and liquid from production fluid includes directing production fluid upwards between the casing and the impermeable portion, directing the production fluid over the upper end of the impermeable portion, and directing the production fluid downwards to the inlet port.

BRIEF DESCRIPTION OF THE DRAWINGS

Details of this invention are described in connection with the accompanying drawings that bear similar reference numerals in which:

FIG. 1 is a side elevation view of a separator system embodying features of the present invention.

FIG. 2 is a partially cut away side elevation view of the system of FIG. 1.

FIG. 3 is a top plan view of a cone for the system of FIG. 1.

FIG. 4 is a sectional view taken along line 4—4 of FIG. 3.

FIG. 5 is a side elevation view of an internal gas sleeve for the system of FIG. 1.

FIG. 6 is a top plan view of a motor adapter for the system of FIG. 1.

FIG. 7 is a sectional view taken along line 7—7 of FIG. 6.

FIG. 8 is a schematic diagram of a well that utilizes the separator system of FIG. 1.

DETAILED DESCRIPTION OF THE INVENTION

Referring now to FIGS. 1 and 2, a separator system 10 embodying features of the present invention includes a means for pumping 11 and a shroud 12. The means for pumping 11 has a cone 14, a nipple 15, a pump 16, a rotary separator 17, a motor 18 and an internal gas sleeve 19. As shown in FIGS. 3 and 4, the cone 14 has a substantially circular cross section and is hollow, with an interior surface 21 defining an interior cavity 22. The interior surface 21 includes an internally threaded, cylindrical upper section 23, a cylindrical intermediate section 24 and an internally threaded, cylindrical lower section 25.

The exterior of the cone 14 includes a cylindrical upper surface 26, an intermediate surface 27 that extends downwardly and outwardly from the upper surface 26, and a lower surface 28. The lower surface 28 has a cylindrical outer section 29 that extends downwardly from the intermediate section 27, a downwardly facing first step section 30 that extends inwardly from the outer section 29, a first recessed section 31 that extends downwardly the first step section 30, a downwardly facing second step section 32 that extends inwardly from the first recessed section 31, and a second recessed section 33 that extends downwardly the second step section 32. A downwardly facing bottom surface 34 connects from the second recessed section 33 to the lower section 25 of the interior surface 21.

A circumferential sleeve o-ring groove 36 extends around the second recessed section 33, near the bottom surface 34, and a sleeve o-ring 37 is mounted in the sleeve oaring groove 36. A plurality of radially spaced, internally threaded shroud fastener apertures 38 extend inwardly at the first recessed section 31. A vertical cable groove 40 recessed into the cone 14 extends from the upper surface 26 to the second step section 32 of the lower surface 28. A cable strap 41 extends across the cable groove 40 at the intermediate surface 27. An internally threaded plug aperture 43 extends, opposite the cable strap 41, from the intermediate surface 27 to the intermediate section 24 of the interior surface 21, and an externally threaded plug 44 is mounted in the plug aperture 43. A plurality of radially spaced, substantially vertical gas outlet passages 46 extend through the cone 14 from the bottom surface 34 to the intermediate surface 27.

Referring again to FIGS. 1 and 2, the nipple 15 is an elongated hollow pipe with an externally threaded upper end 48 and a spaced, externally threaded lower end 49. The upper end 48 threads into the lower section 25 of the interior surface 21 of the cone 14. The pump 16 may be any conventional downhole well pump. In the illustrated embodiment the pump 16 is generally cylindrical, and has a internally threaded outlet port 51 at the upper end and a spaced inlet port 52 at a lower end, opposite the outlet port 51. The outlet port 51 threads onto the lower end 49 of the nipple 15.

The separator 17 may be any conventional downhole, liquid and gas, rotary separator. In the illustrated embodiment the separator 17 is generally cylindrical, and has an upper end 54, a spaced lower end 55, opposite the upper end 54, and an exterior surface 56 extending between the upper and lower ends 54 and 55. The upper end 54 has a liquid outlet port 57, and the separator 17 mounts onto the pump 16 with liquid outlet port 57 connected to the inlet port 52 of the pump 16. Generally the separator 17 is attached to the pump 16 with mechanical fasteners. A circumferential channel 58 extends around the exterior surface 56, near the upper end 54. Radially spaced gas outlet ports 59 extend from the separator 17 to the channel 58. Radially spaced inlet ports 60 extend through the exterior surface 56 into the separator 17 near the lower end 55. The separator 17 includes a motor flange 61 at the lower end 55.

The motor 18 is generally an elongated cylinder with an upper end 63, a spaced lower end 64, opposite the upper end 63, and an exterior surface 65 extending between the upper and lower ends 63 and 64. The upper end 63 of the motor 18 mounts on the motor flange 61 of the separator 17. The motor 18 mechanically drives the separator 17 and the pump 16.

As shown in FIG. 5, the internal gas sleeve 19 has a generally hollow cylindrical shape and includes a upper end 67, a spaced lower end 68, and a collar 69 around the lower end 68. Referring to FIG. 2, the upper end 67 of the internal gas sleeve 19 fits around the second recessed section 33 of the lower surface 28 of the cone 14 and is sealed by the sleeve o-ring 37. The internal gas sleeve 19 extends downwardly around the nipple 15, the pump 16 and the upper end 54 of the separator 17. The collar 69 extends below and is sealed below the channel 58 of the separator 17 so that gas flowing out of the gas outlet ports 59 of the separator 17 flows upwardly inside the internal gas sleeve 19 to the gas outlet passages 46 of the cone 14.

The shroud 12 substantially surrounds the means for pumping, and includes an upper porous portion 72 and a lower impermeable portion 73. In the illustrated embodiment the porous portion 72 has a hollow, cylindrical shape and is formed from metal screen. The porous portion 72 has an upper end 75 and a spaced lower end 76. The upper end 75 is sized and shaped to fit over the first recessed section 31 of the lower surface 28 of the cone 14 and is attached to the first recessed section 31 by shroud fasteners 77 in the shroud fastener apertures 38.

The impermeable portion 73 has an upper end 78 and a lower end 79, and includes a tubular portion 80 and a motor adapter 81. The tubular portion 80 has a hollow, cylindrical shape and is a stainless steel pipe in the illustrated embodiment. The tubular portion 80 has an upper end 83 that forms the upper end of the impermeable portion 73 and attaches to the lower end 76 of the porous portion 72. The tubular portion 80 has a spaced lower end 84, opposite the upper end 83. Referring to FIGS. 6 and 7, the motor adapter 81 has an outer surface 85 with an upper recessed portion 86 that is sized and shaped to fit into the lower end 84 of the tubular portion 80. The motor adapter 81 is welded or otherwise attached to the tubular portion 80. The motor adapter 81 includes an inner surface 88 sized and shaped to fit around the motor 18. The inner surface 88 has a circumferential adapter o-ring groove 89 and an adapter o-ring 90 in the adapter o-ring groove 89 that seals the motor adapter 81 around the exterior surface 65 of the motor 18.

As shown in FIGS. 1 and 2 the upper end 78 of the impermeable portion 73 is located above the inlet port 60 of the separator 17. FIG. 8 shows a coal formation methane well 92 including a casing 93 and a tubing string 94 inside the casing 93 extending from the ground surface 95 down to a coal formation 96. The upper section 23 of the interior surface 21 of the cone 14 threads onto the tubing string 94 with the separator system 10 extending downward therefrom in an open hole 97 in the coal formation 96. The separator system 10 separates production fluid from the coal formation 96 into liquid and gas, and pumps the liquid up to the ground surface 95 and away through liquid supply line 98, with the gas traveling upwards to the ground surface 95 between the casing 93 and the tubing string 94, and away through gas supply line 99.

Production fluid from the open hole 97 travels upwards between the casing 93 and the impermeable portion 73 of the shroud 12. When the production fluid reaches the upper end 78 of the impermeable portion 73, the production fluid flows through the porous portion 72 and downwards between the impermeable portion 73 and the means for pumping 11 to the inlet port 60 of the separator 17. As the production fluid changes from upwards flow to downwards flow, a pressure drop is generated in the production fluid and the production fluid releases gas that flows upwards.

The separator system 10 also functions with the means for pumping 11 having the pump 16 attached directly to the motor 18, with the rotary separator 17 and internal gas sleeve 19 eliminated. Preferably the vertical distance from the upper end 78 of the impermeable portion 73 to the inlet port 60 of the separator 17, when the separator 17 is provided, or the inlet port 52 of the pump, when the separator 17 is not provided, is at least six feet. This distance is generally determined by the amount of gas and water available in the well 92. About 40–60% of the gas is released from the production fluid before the production fluid flows through the porous portion 72 and an additional 20% of the gas is released as the production fluid flows downward from the upper end 78 of the impermeable portion 73. Therefore, the separator system 10 of the present invention separates a significant portion of gas from the production fluid before the production fluid reaches the inlet port 60, providing more efficient and reliable operation of the pump 16. The cable groove 40 and the cable strap 41 in the cone 14 allow wiring for the motor 18 to run inside of the shroud 12, thereby protecting the wiring and providing easier installation.

Although the present invention has been described with a certain degree of particularity, it is understood that the present disclosure has been made by way of example and that changes in details of structure may be made without departing from the spirit thereof.

What is claimed is:

1. A downhole separator system, for a well having a tubing string and a casing with a bottom end, comprising:
    means for pumping liquid up said tubing string, said means for pumping having an inlet port, and
    a shroud including an impermeable portion spaced around said means for pumping, said impermeable portion having a closed lower end below said inlet port, and an open upper end above said inlet port,
    whereby production fluid in said well flows over said upper end of said impermeable portion, and then downwards between said impermeable portion and said means for pumping to said inlet port, thereby releasing a significant portion of gas from said production fluid before said production fluid reaches said inlet port.

2. The separator system as set forth in claim 1 wherein said upper end of said impermeable portion is above and inside said bottom end of said casing, whereby said production fluid flows upwards between said casing and said impermeable portion before flowing over said upper end of said impermeable portion.

3. The separator system as set forth in claim 1 wherein said means for pumping includes a pump and a motor connected to and extending downward from said pump.

4. The separator system as set forth in claim 1 wherein said means for pumping includes a pump, a separator connected to and extending downward from said pump and a motor connected to and extending downward from said separator.

5. The separator system as set forth in claim 4 wherein said means for pumping includes a cone connected to said tubing string and a nipple connected between said pump and said cone.

6. The separator system as set forth in claim 5 wherein said separator has a gas outlet port, said cone has a gas outlet passage, and said means for pumping has an internal gas sleeve around said gas outlet port of said separator, said pump and said nipple, said sleeve extending to gas outlet passage of said cone to divert gas from said gas outlet port of said separator through said gas outlet passage into said casing above said cone.

7. The separator system as set forth in claim 1 wherein means for pumping includes a motor and said impermeable portion includes a motor adapter that extends around said motor at said lower end of said impermeable portion to close said lower end.

8. The separator system as set forth in claim 1 wherein said shroud includes a porous portion connected to said upper end of said impermeable portion and extending around said means for pumping.

9. The separator system as set forth in claim 8 wherein said porous portion includes screen.

10. The separator system as set forth in claim 8 wherein said porous portion extends upwardly from said upper end of said impermeable portion.

11. The separator system as set forth in claim 10 including a cone connected to said tubing string with said porous portion being connected to and extending downwards from said cone.

12. The separator system as set forth in claim 1 wherein said upper end of said impermeable portion is at least six feet above said inlet port.

13. A downhole separator system, for a well having a tubing string and a casing with a bottom end, comprising:

a hollow cone connected to said tubing string and having at least one gas outlet passage, a hollow elongated nipple connected to and extending downwards from said cone, a pump connected to and extending downwards from said nipple, a rotary separator extending downward from said pump, said separator having a gas outlet port, a liquid outlet port and an inlet port, with said liquid outlet port connecting to said pump, a motor extending downwards from said separator, and driving said separator and said pump, an internal gas sleeve around said gas outlet passage of said cone, said nipple, said pump and said gas outlet of said separator, and a shroud around said nipple, said pump, said separator, said motor and said internal gas sleeve, said shroud having an upper porous portion connected to and extending downwards from said cone and a lower impermeable portion connected to and extending downwards from said porous portion, said impermeable portion having an open upper end above said inlet port and said bottom end of said casing and a lower end below said inlet port, said lower end having a motor adapter fitted around said motor to close said lower end, whereby production fluid in said well flows upwards between said casing and said impermeable portion, over said upper end of said impermeable portion, and then downwards inside said impermeable portion to said inlet port, thereby releasing a significant portion of gas from said production fluid before said production fluid reaches said inlet port.

14. A downhole method of separating gas and liquid from production fluid in a well having a tubing string and a casing with a bottom end, comprising the steps:

providing a means for pumping liquid up said tubing string with said means for pumping having an inlet port, providing a shroud including an impermeable portion spaced around said means for pumping, said impermeable portion having a closed lower end below said inlet port, and an open upper end above said inlet port and above said bottom end of said casing, directing said production fluid upwards between said shroud and said casing, directing said production fluid over said upper end of said impermeable portion, and directing said production fluid downwards between said means for pumping and said impermeable portion to said inlet port, whereby said production fluid releases a significant portion of gas as said production fluid flows over said upper end and downwards to said inlet port.

* * * * *